US 9,414,475 B2

(12) United States Patent
Shimanaka (10) Patent No.: US 9,414,475 B2
(45) Date of Patent: Aug. 9, 2016

(54) DISCHARGE DEVICE

(71) Applicant: Murata Manufacturing Co., Ltd., Nagaokakyo-shi, Kyoto-fu (JP)

(72) Inventor: Yasuhiko Shimanaka, Nagaokayo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 131 days.

(21) Appl. No.: 14/274,807

(22) Filed: May 12, 2014

(65) Prior Publication Data

US 2014/0340810 A1    Nov. 20, 2014

(30) Foreign Application Priority Data

May 16, 2013  (JP) ................. 2013-103971

(51) Int. Cl.
| H05F 3/06 | (2006.01) |
| C01B 13/11 | (2006.01) |
| H01T 23/00 | (2006.01) |

(52) U.S. Cl.
CPC ...... *H05F 3/06* (2013.01); *C01B 13/11* (2013.01); *C01B 2201/12* (2013.01); *H01T 23/00* (2013.01)

(58) Field of Classification Search
CPC ....... H05F 3/06; C01B 13/11; C01B 2201/12; H01T 23/00
USPC ............................................ 361/213
See application file for complete search history.

(56) References Cited

U.S. PATENT DOCUMENTS

| 4,652,318 A | 3/1987 | Masuda et al. |
| 6,039,816 A | 3/2000 | Morita et al. |
| 7,764,298 B2 | 7/2010 | Adachi |
| 2009/0001280 A1 | 1/2009 | Adachi |
| 2009/0311008 A1* | 12/2009 | Adachi ............ G03G 15/0291 399/168 |
| 2010/0158582 A1 | 6/2010 | Adachi et al. |
| 2013/0209323 A1 | 8/2013 | Kanamori et al. |

FOREIGN PATENT DOCUMENTS

| JP | 5-166578 A | 7/1993 |
| JP | 06-142169 A | 5/1994 |
| JP | 11-139807 A | 5/1999 |
| JP | 2006-162195 A | 6/2006 |
| JP | 2009-14783 A | 1/2009 |
| JP | 2013-166660 A | 8/2013 |

OTHER PUBLICATIONS

Official Communication issued in corresponding Japanese Patent Application No. 2013-103971, mailed on Jun. 2, 2015.
Official Communication issued in corresponding European Patent Application No. 14167576.9, mailed on Sep. 15, 2014.

* cited by examiner

*Primary Examiner* — Thienvu Tran
*Assistant Examiner* — Kevin J Comber
(74) *Attorney, Agent, or Firm* — Keating & Bennett, LLP (57) ABSTRACT

A discharge device includes a body including a plurality of dielectric layers stacked one above another, a discharge electrode disposed in the body, an induction electrode disposed in the body to face the discharge electrode with at least one of the dielectric layers interposed therebetween, and a heater electrode disposed in a layer different from a layer in which the discharge electrode is disposed, and different from a layer in which the induction electrode is disposed.

19 Claims, 9 Drawing Sheets

DISCHARGE DEVICE

BACKGROUND OF THE INVENTION

1. Field of the Invention

The present invention relates to a discharge device, and more particularly to a discharge device configured to generate ozone or ions.

2. Description of the Related Art

As one example of related-art discharge devices, there is a ceramic discharge substrate disclosed in Japanese Unexamined Patent Application Publication No. 11-139807. In the disclosed ceramic discharge substrate, a discharge electrode is disposed on one surface of the substrate, while an induction electrode and a resistance heater are disposed on the other surface of the substrate. The disclosed ceramic discharge substrate can stably generate discharge at startup because the resistance heater functions to dehumidify the surroundings of the discharge electrode and the induction electrode.

In the ceramic discharge substrate disclosed in Japanese Unexamined Patent Application Publication No. 11-139807, as described above, the induction electrode and the resistance heater are disposed on the other surface of the substrate. The induction electrode and the resistance heater have to be arranged in a state spaced from each other by a predetermined distance such that short-circuiting will not occur. Therefore, the disclosed ceramic discharge substrate has a problem in that a degree of freedom in layout of the resistance heater is low.

SUMMARY OF THE INVENTION

Preferred embodiments of the present invention provide a discharge device that has a high degree of freedom in layout of a heater electrode.

According to a preferred embodiment of the present invention, a discharge device includes a body including a plurality of dielectric layers stacked one above another, a discharge electrode disposed in the body, an induction electrode disposed in the body to face the discharge electrode with at least one of the dielectric layers interposed therebetween, and a heater electrode disposed on a layer different from a layer on which the discharge electrode is disposed, and different from a layer on which the induction electrode is disposed.

With various preferred embodiments of the present invention, a degree of freedom in layout of the heater electrode is significantly increased.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

An ozone generation device according to various preferred embodiments of the present invention will be described below.

Figure 1:
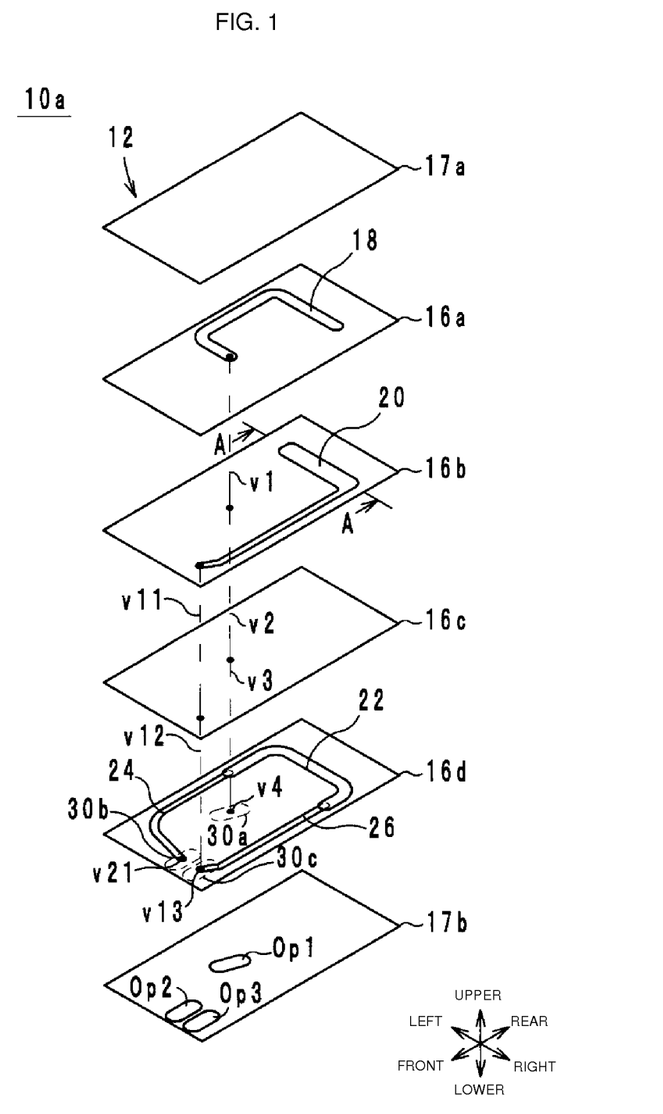
FIG. 1 is an exploded perspective view of an ozone generation device according to a preferred embodiment of the present invention.
Figure 2:
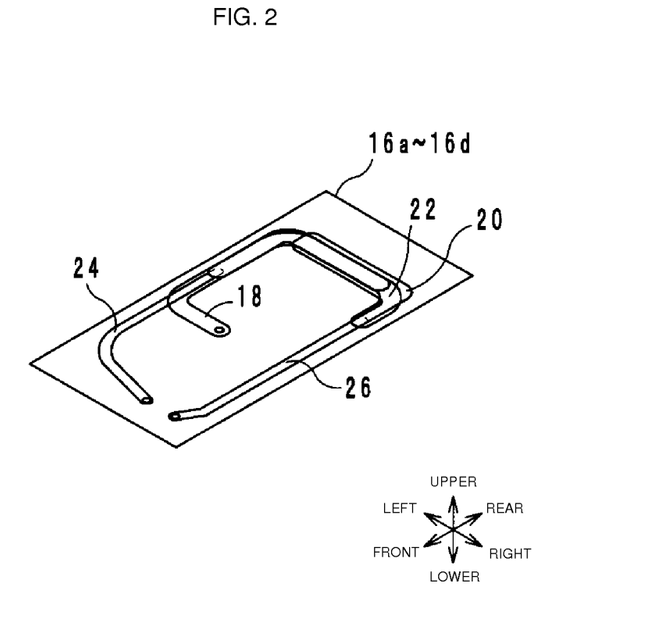
FIG. 2 illustrates, in overlapped relation, a discharge electrode, an induction electrode, and a heater electrode of the ozone generation device illustrated in FIG. 1.
Figure 3:
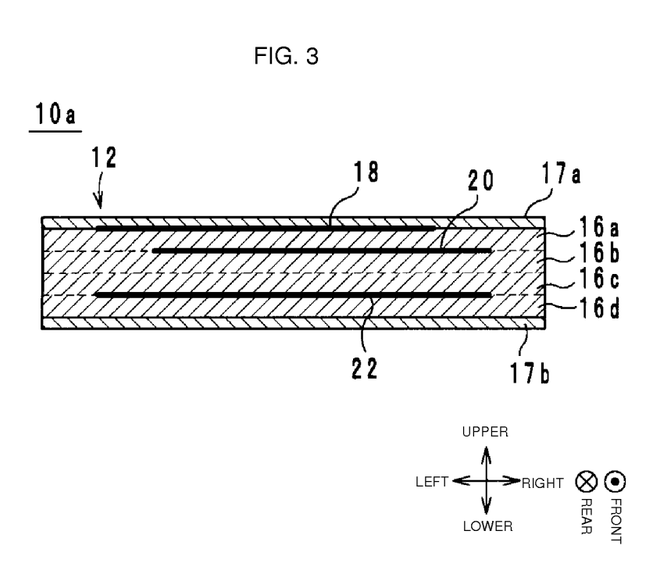
FIG. 3 is a sectional view, taken along a line A-A in FIG. 1, illustrating the structure of the ozone generation device illustrated in FIG. 1.

The structure of the ozone generation device according to a preferred embodiment will be described below with reference to the drawings. FIG. 1 is an exploded perspective view of an ozone generation device 10a according to a preferred embodiment of the present invention. FIG. 2 illustrates, in overlapped relation, a discharge electrode 18, an induction electrode 20, and a heater electrode 22 of the ozone generation device 10a illustrated in FIG. 1. FIG. 3 is a sectional view, taken along a line A-A in FIG. 1, illustrating the structure of the ozone generation device 10a illustrated in FIG. 1. In FIGS. 1 to 3, a stacking direction of layers constituting the ozone generation device 10a is defined as an up and down direction. A direction in which a long side of the ozone generation device 10a extends when looked at in a plan view from above is defined as a front and rear direction. A direction in which a short side of the ozone generation device 10a extends when looked at in a plan view from above is defined as a left and right direction.

As illustrated in FIG. 1, the ozone generation device 10a includes a body 12, a discharge electrode 18, an induction electrode 20, a heater electrode 22, connection conductors 24 and 26, outer electrodes 30a to 30c, and via hole conductors v1 to v4, v11 to v13, and v21.

The body 12 preferably is a multilayer body made of a LTCC (low temperature co-fired ceramic) and having a rectangular or substantially rectangular plate-shaped configuration. The body is preferably formed by stacking a protective layer 17a, dielectric layers 16a to 16d, and a protective layer 17b in the mentioned order from the upper side toward the lower side. Each of the dielectric layers 16a to 16d preferably has a rectangular or substantially rectangular shape and preferably is made of a glass ceramic that is a mixture of glass ($CaO—Al_2O_3—B_2O_3—SiO_2$) powder and alumina ($Al_2O_3$) filler. Each of the protective layers 17a and 17b preferably has a rectangular or substantially rectangular shape and is preferably made of a glass ceramic as with the dielectric layers 16a to 16d. In the following description, respective surfaces of the body 12, the dielectric layers 16a to 16d, and the protective layers 17a and 17b on the upper side are called upper surfaces, whereas respective surfaces of the body 12, the dielectric layers 16a to 16d, and the protective layers 17a and 17b on the lower side are called lower surfaces.

As illustrated in FIG. 1, the discharge electrode 18 is an electrode preferably in the form of a line, which preferably is made of Ag and which is disposed on the upper surface of the dielectric layer 16a. Cu, Pd or $RuO_2$, for example, may also be used instead of Ag. The discharge electrode 18 extends from a point near a center (intersection point of diagonal lines) of the dielectric layer 16a to the vicinity of a left long side thereof, then extends along the left long side to the vicinity of a rear short side, and further extends toward the right side. In the following description, an end portion of the discharge electrode 18, which is positioned near the center of the dielectric layer 16a, is called one end, and an end portion of the discharge electrode 18, which is positioned near a rear right corner of the dielectric layer 16a, is called the other end.

As illustrated in FIG. 1, the induction electrode 20 is an electrode preferably in the form of a line, which is preferably made of Ag and which is disposed on the upper surface of the dielectric layer 16b. Cu, Pd or $RuO_2$, for example, may also be used instead of Ag. The induction electrode 20 extends from a front right corner of the dielectric layer 16b to the vicinity of a rear short side along a right long side thereof, and further extends toward the left side. Thus, as illustrated in FIG. 2, a portion of the discharge electrode 18, which extends from the left long side of the dielectric layer 16a toward the right side (i.e., to the other end of the discharge electrode 18), is positioned to face a portion of the induction electrode 20, which extends from the right long side of the dielectric layer 16b toward the left side, with the dielectric layer 16a interposed between those portions of both the electrodes 18 and 20. In the following description, an end portion of the induction electrode 20, which is positioned near the front right corner of the dielectric layer 16b, is called one end, and an end portion of the induction electrode 20, which is positioned near a rear left corner of the dielectric layer 16b, is called the other end.

As illustrated in FIG. 1, the heater electrode 22 is an electrode preferably in the form of a line, which is preferably made of, e.g., Nichrome or $RuO_2$ and which is disposed on the upper surface of the dielectric layer 16d different from the dielectric layers 16a and 16b including respectively the discharge electrode 18 and the induction electrode 20 disposed thereon. The material of the heater electrode 22 has a greater electrical resistivity than the materials of the discharge electrode 18 and the induction electrode 20. Ag, Cu or Pd, for example, may also be used instead of Nichrome or $RuO_2$. The heater electrode 22 extends along a rear short side of the dielectric layer 16d. Thus, as illustrated in FIG. 2, the heater electrode 22 is positioned to face the portion of the induction electrode 20, which extends from the right long side of the dielectric layer 16b toward the left side (i.e., to the other end of the induction electrode 20) with the dielectric layers 16b and 16c interposed therebetween. Stated in another way, the portion of the discharge electrode 18, which extends from the left long side of the dielectric layer 16a toward the right side (i.e., to the other end of the discharge electrode 18), the portion of the induction electrode 20, which extends from the right long side of the dielectric layer 16b toward the left side (i.e., to the other end of the induction electrode 20), and the heater electrode 22 are overlapped with one another when looked at in a plan view from above. In the following description, a left end portion of the heater electrode 22 is called one end, and a right end portion of the heater electrode 22 is called the other end.

Furthermore, as illustrated in FIG. 3, the shortest distance between the discharge electrode 18 and the heater electrode 22 is longer than that between the discharge electrode 18 and the induction electrode 20. In other words, the induction electrode 20 is disposed nearer to the discharge electrode 18 than the heater electrode 22. In addition, the induction electrode 20 and the heater electrode 22 are disposed on one side (i.e., the lower side) in the stacking direction relative to the discharge electrode 18.

As illustrated in FIG. 1, the connection conductor 24 is an electrode preferably in the form of a line, which preferably is made of Ag and which is disposed on the upper surface of the dielectric layer 16d. The connection conductor 24 is connected to the one end of the heater electrode 22. Cu, Pd or $RuO_2$, for example, may also be used instead of Ag. The connection conductor 24 extends from the one end of the heater electrode 22 to the vicinity of a front short side of the dielectric layer 16d along the left long side thereof, and further extends toward the right side along the front short side of the dielectric layer 16d.

As illustrated in FIG. 1, the connection conductor 26 is an electrode preferably in the form of a line, which is preferably made of Ag and which is disposed on the upper surface of the dielectric layer 16d. The connection conductor 26 is connected to the other end of the heater electrode 22. Cu, Pd or $RuO_2$, for example, may also be used instead of Ag. The connection conductor 26 extends from the other end of the heater electrode 22 to the vicinity of the front short side of the dielectric layer 16d along the right long side thereof.

The outer electrode 30a is disposed near a center of the lower surface of the dielectric layer 16d. The outer electrodes 30b and 30c are disposed near a front short side of the lower surface of the dielectric layer 16d. The outer electrode 30c is disposed on the right side of the outer electrode 30b. The outer electrodes 30a to 30c are each preferably formed, for example, by coating a resistance paste made of $RuO_2$ on an underlying electrode made of Ag for the purpose of preventing corrosion. Ni-plating and Sn-plating, for example, may be applied instead of coating the resistance paste made of $RuO_2$. However, coating the resistance paste is more preferable because the plating accompanies with a risk that an amount of generated ozone may reduce due to corrosion.

Openings Op1 to Op3 are provided in the protective layer 17b. The openings Op1 to Op3 are arranged in overlapped relation to the outer electrodes 30a to 30c, respectively. Therefore, the outer electrodes 30a to 30c are exposed to the outside through the openings Op1 to Op3, respectively.

The via hole conductors v1 to v4 penetrate through the dielectric layers 16a to 16d in the up and down direction, respectively. The via hole conductors v1 to v4 are interconnected to constitute one via hole conductor, thus connecting the one end of the discharge electrode 18 and the outer electrode 30a to each other.

The via hole conductors v11 to v13 penetrate through the dielectric layers 16b to 16d in the up and down direction, respectively. The via hole conductors v11 to v13 are interconnected to constitute one via hole conductor, thus connecting the one end of the induction electrode 20 and the outer electrode 30c to each other. Moreover, the via hole conductor v13 interconnects the connection conductor 26 and the outer electrode 30c. As a result, the other end of the heater electrode 22 and the outer electrode 30c are electrically connected to each other.

The via hole conductor v21 penetrates through the dielectric layer 16d in the up and down direction, thus interconnecting the connection conductor 24 and the outer electrode 30b. As a result, the one end of the heater electrode 22 and the outer electrode 30b are electrically connected to each other. The via hole conductors v1 to v4, v11 to v13, and v21 are constituted by filling a conductive paste, which contains, e.g., Ag as a main component, in through-holes formed in the dielectric layers 16a to 16d. Cu, Pd or $RuO_2$, for example, may also be used instead of Ag.

In the ozone generation device 10a configured as described above, only the one end of the discharge electrode 18 is electrically connected to the outer electrode 30a. Similarly, only the one end of the induction electrode 20 is electrically connected to the outer electrode 30c. On the other hand, both the ends of the heater electrode 22 are electrically connected to the outer electrodes 30b and 30c, respectively.

In the ozone generation device 10a according to the present preferred embodiment, the outer electrode 30a electrically connected to the one end of the discharge electrode 18 corresponds to a "first outer electrode". The outer electrode 30c electrically connected to the one end of the induction electrode 20 and to the other end (corresponding to a "first end portion") of the heater electrode 22 corresponds to a "second outer electrode". The outer electrode 30b electrically connected to the one end (corresponding to a "second end portion") of the heater electrode 22 corresponds to a "third outer electrode".

In the ozone generation device 10a configured as described above, a high AC voltage is applied to the outer electrode 30a, and the outer electrode 30c is held at a ground potential. The high AC voltage preferably is, for example, an AC voltage having a frequency of about 20 kHz to about 50 kHz and a peak-to-peak voltage of about 4 kV to about 7 kV. Furthermore, a relatively low DC voltage of about 12 V is applied to the outer electrode 30b, for example.

When the high AC voltage is applied to the outer electrode 30a, a strong electric field is generated near an outer edge of the discharge electrode 18 in accordance with an AC period of the high AC voltage. In such a state, two phenomena occur repeatedly, i.e., a phenomenon that electrons are released from a region of the upper surface of the protective layer 17a, which region is positioned near the outer edge of the discharge electrode 18, due to an induced potential, and the electrons are provided to a region of the upper surface of the protective layer 17a, which region is positioned near the outer edge of the induction electrode 20, and a phenomenon that the electrons are returned from the region of the upper surface of the protective layer 17a, which is positioned near the outer edge of the induction electrode 20, to the region of the upper surface of the protective layer 17a, which is positioned near the outer edge of the discharge electrode 18. As a result, discharge is generated around the region of the upper surface of the protective layer 17a, which is positioned near the outer edge of the discharge electrode 18, and ozone is generated from oxygen passing over the region of the upper surface of the protective layer 17a, which is positioned near the outer edge of the discharge electrode 18.

Furthermore, because the DC voltage is applied to the heater electrode 22, the heater electrode 22 generates heat. Therefore, the temperature around the discharge electrode 18 rises, and the humidity around the discharge electrode 18 lowers. Accordingly, the occurrence of condensation droplets is significantly reduced or prevented around the discharge electrode 18.

An example of a method of manufacturing the ozone generation device 10a will be described below with reference to FIG. 1. It is to be noted that, while the manufacturing method for one ozone generation device 10a is described here, a plurality of multilayer bodies preferably is manufactured at the same time in practice by stacking large-sized mother ceramic green sheets to fabricate a mother multilayer body, and by cutting the mother multilayer body into plural multilayer bodies per unit size.

First, ceramic green sheets are fabricated which become the dielectric layers 16a to 16d and the protective layers 17a and 17b later. More specifically, a glass ceramic slurry made of a mixture of glass powder and alumina filler is prepared. The prepared glass ceramic slurry is formed into a sheet-shape configuration on a carrier film of PET (polyethylene terephthalate) by the doctor blade method, and is then dried to fabricate the ceramic green sheets that become the dielectric layers 16a to 16d and the protective layers 17a and 17b later.

Next, the via hole conductors v1 to v4, v11 to v13, and v21 are formed in the ceramic green sheets to define the dielectric layers 16a to 16d later. More specifically, via holes are formed in the ceramic green sheets, which become the dielectric layers 16a to 16d later, by irradiating the ceramic green sheets with a laser beam. A paste containing a conductor material, e.g., Ag, is filled into the via holes by printing or any other suitable method, thus forming the via hole conductors v1 to v4, v11 to v13, and v21.

Next, the openings Op1 to Op3 are formed in the ceramic green sheets, which become the protective layer 17b later, by punching with a punch, for example.

Next, the discharge electrode 18, the induction electrode 20, and the connection conductors 24 and 26 are formed, as illustrated in FIG. 1, by applying a paste, made of a conductive material containing, e.g., Ag, to upper surfaces of the ceramic green sheets by screen printing, which become the dielectric layers 16a, 16b, and 16d later. The paste made of the conductive material is prepared, for example, by adding varnish and a solvent to e.g. Ag powder.

Next, the heater electrode 22 is formed, as illustrated in FIG. 1, by applying a paste, made of a conductive material containing, e.g., $RuO_2$, to the upper surface of the ceramic green sheet with screen printing, which becomes the dielectric layer 16d later. The paste made of the conductive material is prepared, for example, by adding varnish and a solvent to metal powder, e.g., $RuO_2$ powder.

Next, Ag electrodes serving as respective underlying electrodes for the outer electrodes 30a to 30c are formed, as illustrated in FIG. 1, by applying a paste, made of a conductive material containing, e.g., Ag, to a lower surface of the ceramic green sheet with screen printing, which becomes the dielectric layer 16d later. The paste made of the conductive material is prepared, for example, by adding varnish and a solvent to metal powder, e.g., Ag powder.

Next, a mother multilayer body in an unfired state is preferably formed by stacking and tentatively pressure-bonding the ceramic green sheets, which become the protective layer 17a, the dielectric layers 16a to 16d, and the protective layer 17b later one by one such that those layers are arranged in the mentioned order from the upper side toward the lower side in the up and down direction. Thereafter, main pressure bonding is performed on the mother multilayer body by thermal compression bonding.

Next, the mother multilayer body is cut into individual unfired bodies 12.

Next, the unfired bodies 12 are each subject to a binder removing process and a firing process. As a result, the dielectric layers 16a to 16d and the protective layers 17a and 17b are fired at the same time.

Finally, the outer electrodes 30a to 30c are formed by applying a high resistance paste made of $RuO_2$ to surfaces of the Ag electrodes that become the outer electrodes 30a to 30c later and firing. The ozone generation device 10a is completed through the above-described steps.

According to the ozone generation device 10a, a degree of freedom in layout of the heater electrode 22 is significantly increased as described below. In more detail, the heater electrode is disposed on the dielectric layer 16d different from the dielectric layer 16a on which the discharge electrode 18 is disposed, and from the dielectric layer 16b on which the induction electrode 20 is disposed. Therefore, even when the heater electrode 22, the discharge electrode 18, and the induction electrode 20 are arranged close to each other when looked at in a plan view from above, short-circuiting is prevented from occurring between those electrodes. As a result, the degree of freedom in layout of the heater electrode 22 is increased in the ozone generation device 10a.

Furthermore, since, as described above, the heater electrode 22, the discharge electrode 18, and the induction electrode 20 are arranged close to each other in the ozone generation device 10a, the size of the ozone generation device 10a is significantly reduced.

According to the ozone generation device 10a, discharge is more stably generated. In more detail, when the humidity in the surroundings of the discharge electrode 18 and the induction electrode 20 rises, a leak current tends to more easily generate between the discharge electrode 18 and the induction electrode 20. This gives rise to a situation that discharge is less apt to generate between the discharge electrode 18 and the induction electrode 20.

Taking into account the above-mentioned point, the heater electrode 22 is disposed in the ozone generation device 10a. The heater electrode 22 functions to lower the humidity in the surroundings of the discharge electrode 18 and the induction electrode 20, and to significantly reduce or prevent the generation of the leak current between the discharge electrode 18 and the induction electrode 20. Moreover, in the ozone generation device 10a, the heater electrode 22 is disposed, as described above, on the dielectric layer 16d different from the dielectric layer 16a on which the discharge electrode 18 is disposed, and from the dielectric layer 16b on which the induction electrode 20 is disposed. Therefore, the heater electrode 22 is arranged in overlapped relation to the discharge electrode 18 when looked at in a plan view from above. Such an arrangement more effectively lowers the humidity in the surroundings of the discharge electrode 18. As a result, the ozone generation device 10a generates discharge more reliably.

According to the ozone generation device 10a, the shortest distance between the discharge electrode 18 and the heater electrode 22 is longer than that between the discharge electrode 18 and the induction electrode 20. Such an arrangement ensures that discharge is generated between the discharge electrode 18 and the induction electrode 20, and that the generation of discharge between the discharge electrode 18 and the heater electrode 22 is significantly reduced or prevented.

According to the ozone generation device 10a, the discharge electrode 18, the induction electrode 20, and the heater electrode 22 are disposed on the upper surfaces of the different dielectric layers 16a, 16b, and 16d, respectively. Therefore, short-circuiting is prevented from occurring between two of the discharge electrode 18, the induction electrode 20, and the heater electrode 22.

According to the ozone generation device 10a, the discharge electrode 18, the induction electrode 20, and the heater electrode 22 are disposed inside the body 12 and are not exposed to the outside. Therefore, any of the discharge electrode 18, the induction electrode 20, and the heater electrode 22 is prevented from contacting a conductor that is present around the ozone generation device 10a.

According to the ozone generation device 10a, after forming the discharge electrode 18, the induction electrode 20, the heater electrode 22, and the connection conductors 24 and 26 on the dielectric layers 16a, 16b, and 16d, the dielectric layers 16a to 16d and the protective layers 17a and 17b are stacked into the body 12, and the body 12 is then fired. In other words, when the body 12 is fired, the discharge electrode 18, the induction electrode 20, the heater electrode 22, and the connection conductors 24 and 26 are also fired together. Therefore, the firing of the discharge electrode 18, the induction electrode 20, the heater electrode 22, and the connection conductors 24 and 26 preferably are performed at the same time as the firing of the body 12. As a result, the number of manufacturing steps of the ozone generation device 10a is significantly reduced.

First Modification

Figure 4:
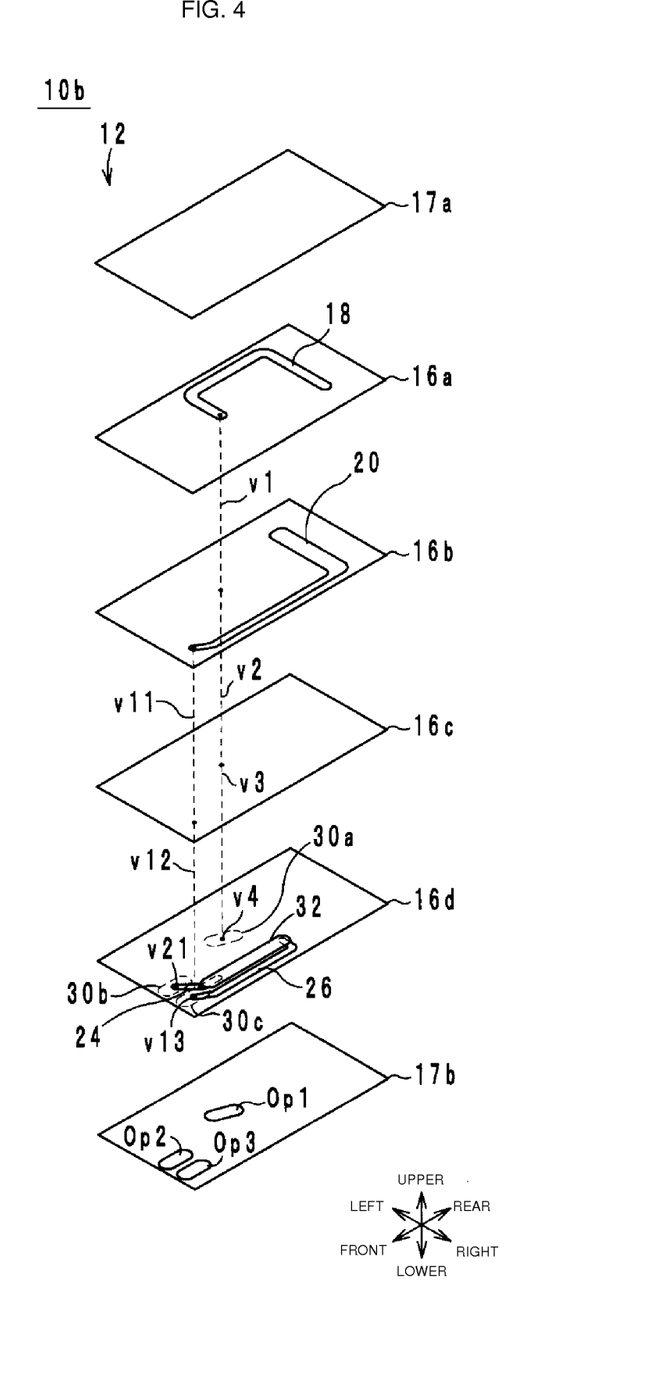
FIG. 4 is an exploded perspective view of an ozone generation device according to a first modification of a preferred embodiment of the present invention.
Figure 5:
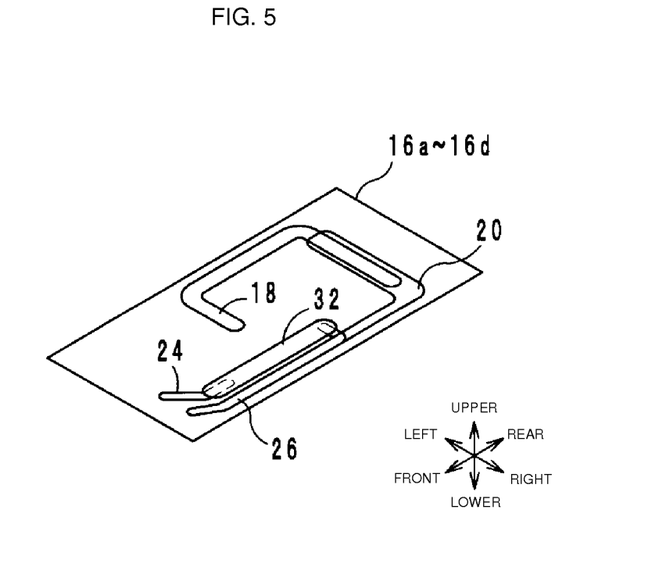
FIG. 5 illustrates, in overlapped relation, a discharge electrode, an induction electrode, and a heater electrode of the ozone generation device illustrated in FIG. 4.

An ozone generation device 10b according to a first modification of a preferred embodiment of the present invention will be described below with reference to the drawings. FIG. 4 is an exploded perspective view of the ozone generation device 10b according to the first modification. FIG. 5 illustrates, in overlapped relation, a discharge electrode 18, an induction electrode 20, and a heater electrode 32 of the ozone generation device 10b illustrated in FIG. 4.

The ozone generation device 10b is different from the ozone generation device 10a in that the heater electrode 32 is disposed instead of the heater electrode 22. The following description of the ozone generation device 10b is made primarily about such a different point.

As illustrated in FIG. 4, the heater electrode 32 is disposed on the upper surface of the dielectric layer 16d. The heater electrode 32 extends along the right long side of the dielectric layer 16d. However, as illustrated in FIG. 5, the heater electrode 32 is disposed on the left side of a portion of the induction electrode 20, which extends along the right long side of the dielectric layer 16b, when looked at in a plan view from above. Thus, the heater electrode 32 is disposed between the one end of the discharge electrode 18 and the portion of the induction electrode 20, which extends along the right long side of the dielectric layer 16b, when looked at in a plan view from above. Furthermore, the heater electrode 32 is electrically connected to the outer electrodes 30b and 30c through the connection conductors 24 and 26.

According to the ozone generation device 10b constituted as described above, discharge is stably generated. More specifically, in the arrangement that the one end of the discharge electrode 18 and the portion of the induction electrode 20, which extends along the right long side of the dielectric layer 16b, are positioned close to each other, there is a possibility that a leak current may be generated therebetween. Taking into account the above-mentioned point, in the ozone generation device 10b, the heater electrode 32 is disposed between the one end of the discharge electrode 18 and the portion of the induction electrode 20, which extends along the right long side of the dielectric layer 16b, when looked at in a plan view from above. The presence of the heater electrode 32 at such a position is effective in preventing the generation of a leak current therebetween. As a result, the ozone generation device 10b stably and reliably generates discharge.

Second Modification

Figure 6:
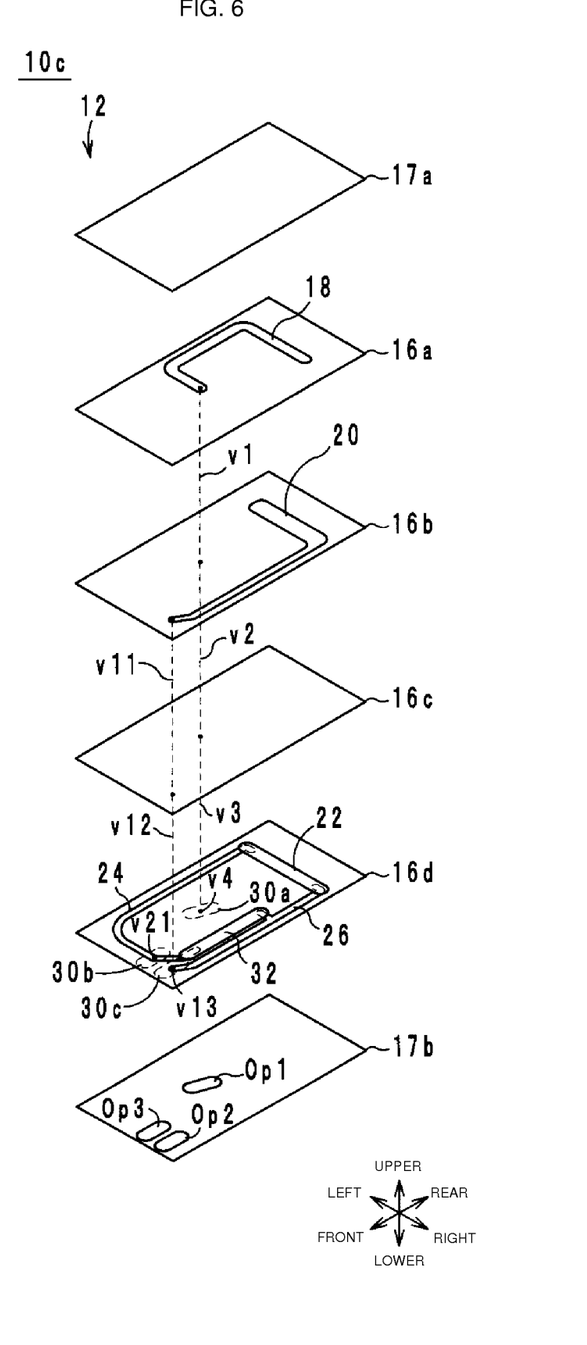
FIG. 6 is an exploded perspective view of an ozone generation device according to a second modification of a preferred embodiment of the present invention.
Figure 7:
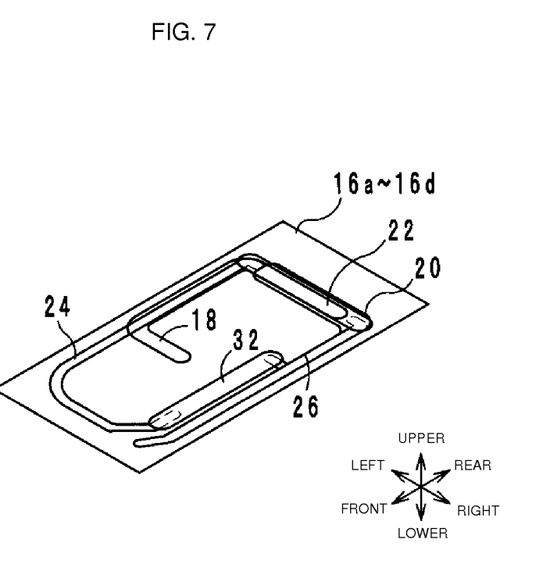
FIG. 7 illustrates, in overlapped relation, a discharge electrode, an induction electrode, and a heater electrode of the ozone generation device illustrated in FIG. 6.

An ozone generation device 10c according to a second modification of a preferred embodiment of the present invention will be described below with reference to the drawings. FIG. 6 is an exploded perspective view of the ozone generation device 10c according to the second modification. FIG. 7 illustrates, in overlapped relation, a discharge electrode 18, an induction electrode 20, and heater electrodes 22 and 32 of the ozone generation device 10c illustrated in FIG. 6.

The ozone generation device 10c is different from the ozone generation device 10b in further including the heater electrode 22. The following description of the ozone generation device 10c is made primarily about such a different point.

The heater electrode 22 of the ozone generation device 10c has the same configuration as the heater electrode 22 of the ozone generation device 10a. Furthermore, the heater electrode 32 of the ozone generation device 10c has the same configuration as the heater electrode 32 of the ozone generation device 10b. The heater electrodes 22 and 32 are electrically connected to the outer electrodes 30b and 30c through the connection conductors 24 and 26.

According to the ozone generation device 10c configured as described above, discharge is stably and reliably generated as with the ozone generation devices 10a and 10b.

Third Modification

Figure 8:
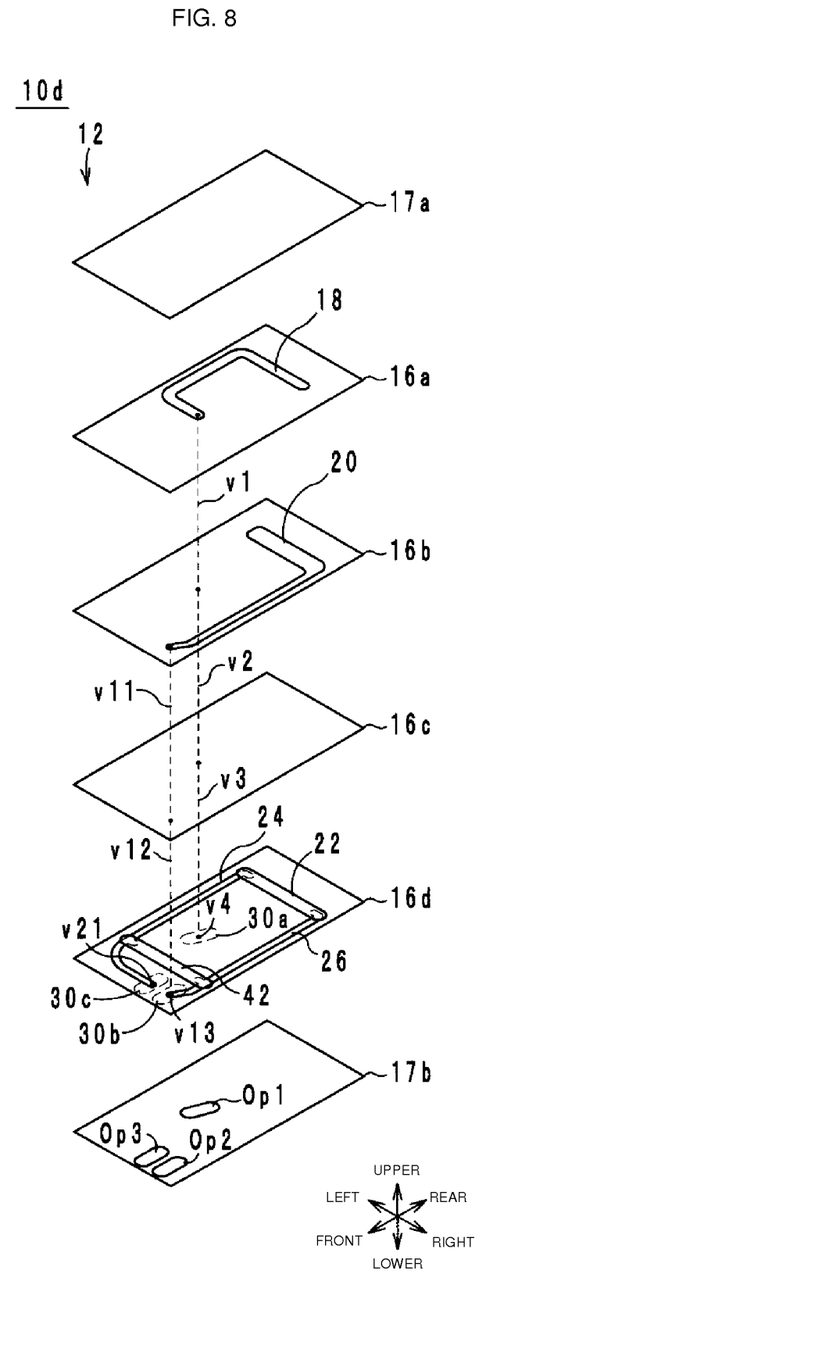
FIG. 8 is an exploded perspective view of an ozone generation device according to a third modification of a preferred embodiment of the present invention.
Figure 9:
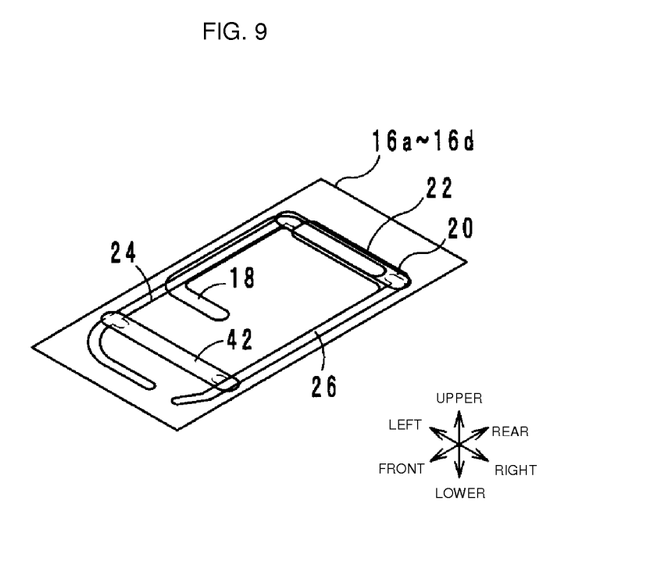
FIG. 9 illustrates, in overlapped relation, a discharge electrode, an induction electrode, and a heater electrode of the ozone generation device illustrated in FIG. 8.

An ozone generation device 10d according to a third modification of a preferred embodiment of the present invention will be described below with reference to the drawings. FIG. 8 is an exploded perspective view of the ozone generation device 10d according to the third modification. FIG. 9 illustrates, in overlapped relation, a discharge electrode 18, an induction electrode 20, and heater electrodes 22 and 42 of the ozone generation device 10d illustrated in FIG. 8.

The ozone generation device 10d is different from the ozone generation device 10c in that the heater electrode 42 is provided instead of the heater electrode 32. The following description of the ozone generation device 10d is made primarily about such a different point.

As illustrated in FIG. 8, the heater electrode 42 is disposed on the upper surface of the dielectric layer 16d. The heater electrode 42 extends in the left and right direction between the outer electrode 30a and the outer electrodes 30b and 30c when looked at in a plan view from above. Furthermore, the heater electrode 42 is electrically connected to the outer electrodes 30b and 30c through the connection conductors 24 and 26.

According to the ozone generation device 10d configured as described above, discharge is stably and reliably generated. In more detail, the AC high voltage is applied to the outer electrode 30a and the DC voltage is applied to the outer electrode 30b, whereas the outer electrode 30c is held at the ground potential. Therefore, a large potential difference occurs between the outer electrode 30a and the outer electrodes 30b and 30c. Hence there is a possibility that, when humidity increases in a region between the outer electrode 30a and the outer electrodes 30b and 30c, a leak current may be generated therebetween.

Taking into account the above-mentioned point, the heater electrode 42 is disposed between the outer electrode 30a and the outer electrodes 30b and 30c when looked at in a plan view from above. With such an arrangement, an increase in the humidity in the region between the outer electrode 30a and the outer electrodes 30b and 30c is prevented, and the occurrence of a leak current therebetween is also prevented. Thus, the ozone generation device 10d stably and reliably generates discharge.

It is to be noted that the heater electrode 42 may be disposed between the outer electrode 30a and the outer electrode 30b, or between the outer electrode 30a and the outer electrode 30c.

Other Preferred Embodiments

The discharge device according to the present invention is not limited to the examples described above as the ozone generation devices 10a to 10d, and it can be modified within the scope not departing from the gist of the present invention.

The configuration of each of the ozone generation devices 10a to 10d of various preferred embodiments of the present invention can be applied to an ion generation device as well, which ionizes air molecules through discharge.

It is desired that the ozone generation devices 10a to 10d of various preferred embodiments of the present invention are applied to a water supply apparatus, a refrigerator, and so on. When the ozone generation devices 10a to 10d are applied to a water supply apparatus, the water supply apparatus can include a humidifying function of vaporizing water in the water supply apparatus by heat generated from the heater electrode 22. Furthermore, since the ozone generation devices 10a to 10d are each preferably made of the glass ceramic, there is no possibility of contact of water with not only lead and other metals, but also organic substances. Accordingly, a water supply apparatus being superior from the viewpoint of hygiene is provided. When the ozone generation devices 10a to 10d of various preferred embodiments of the present invention are applied to a refrigerator, the refrigerator can also include the humidifying function. Retention of moisture and freshness of vegetables in the refrigerator is realized with the humidifying function. Moreover, since the humidifying is executed with the heat generated from the heater electrode 22, moisture used to the humidify is subjected to a sterilization process by heating. Accordingly, a refrigerator being superior from the viewpoint of hygiene can be obtained.

As described above, of various preferred embodiments of the present invention are usefully applied to a discharge device. In particular, of various preferred embodiments of the present invention are superior in that a degree of freedom in layout of the heater electrode is high.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A discharge device comprising:
   a body including a plurality of dielectric layers stacked one above another;
   a discharge electrode disposed in the body;
   an induction electrode disposed in the body to face the discharge electrode with at least one of the dielectric layers interposed therebetween; and
   a heater electrode disposed on one of the dielectric layers that is different from the dielectric layer on which the discharge electrode is disposed, and different from the dielectric layer on which the induction electrode is disposed; wherein
   the heater electrode overlaps with all portions where the induction electrode and the discharge electrode overlap with each other when viewed in a plan view from a stacking direction of the plurality of dielectric layers.

2. The discharge device according to claim 1, wherein a shortest distance between the discharge electrode and the heater electrode is longer than a shortest distance between the discharge electrode and the induction electrode.

3. The discharge device according to claim 2, wherein the heater electrode and the induction electrode are disposed on one side in a stacking direction of the plurality of dielectric layers relative to the discharge electrode.

4. The discharge device according to claim 1, wherein the heater electrode is disposed between the discharge electrode and the induction electrode when viewed in the plan view.

5. The discharge device according to claim 1, further comprising:
a first outer electrode electrically connected to the discharge electrode;
a second outer electrode electrically connected to the induction electrode and to a first end portion of the heater electrode; and
a third outer electrode electrically connected to a second end portion of the heater electrode; wherein
the heater electrode is disposed between the first outer electrode and at least one of the second outer electrode and the third outer electrode when viewed in the plan view.

6. The discharge device according to claim 1, wherein the discharge electrode is line-shaped.

7. The discharge device according to claim 1, wherein the induction electrode is line-shaped.

8. The discharge device according to claim 1, wherein the heater electrode is line-shaped.

9. The discharge device according to claim 1, further comprising at least one connection conductor connected to the heater electrode.

10. The discharge device according to claim 9, wherein the connection electrode is line-shaped.

11. The discharge device according to claim 1, further comprising an outer electrode electrically connected to only one end of the discharge electrode.

12. The discharge device according to claim 1, further comprising an outer electrode electrically connected to only one end of the induction electrode.

13. The discharge device according to claim 1, further comprising an outer electrode electrically connected to both ends of the heater electrode.

14. The discharge device according to claim 1, wherein the heater electrode is disposed between one end of the discharge electrode and a portion of the induction electrode which extends along a long side of the dielectric layer on which the induction electrode is located.

15. The discharge device according to claim 1, further comprising another heater electrode disposed on the same dielectric layer on which the heater electrode is located.

16. The discharge device according to claim 15, wherein the heater electrode and the another heater electrode are perpendicular or substantially perpendicular to each other.

17. The discharge device according to claim 15, wherein the heater electrode and the another heater electrode are parallel or substantially parallel to each other.

18. The discharge device according to claim 15, further comprising outer electrodes and connection conductors, wherein the heater electrode and the another heater electrode are connected to the outer electrodes through the connection conductors.

19. An electronic appliance comprising the discharge device according to claim 1.

* * * * *